(12) United States Patent
Kargenian et al.

(10) Patent No.: US 10,989,241 B2
(45) Date of Patent: Apr. 27, 2021

(54) IMPACT DEVICE

(71) Applicant: Klein Tools, Inc., Lincolnshire, IL (US)

(72) Inventors: John H. Kargenian, Prospect Heights, IL (US); Zachary Carlins, Chicago, IL (US)

(73) Assignee: Klein Tools, Inc., Lincolnshire, IL (US)

( * ) Notice: Subject to any disclaimer, the term of this patent is extended or adjusted under 35 U.S.C. 154(b) by 190 days.

(21) Appl. No.: 16/192,379

(22) Filed: Nov. 15, 2018

(65) Prior Publication Data

US 2019/0152034 A1     May 23, 2019

Related U.S. Application Data

(60) Provisional application No. 62/587,597, filed on Nov. 17, 2017, provisional application No. 62/667,678, filed on May 7, 2018.

(51) Int. Cl.
| | |
|---|---|
| *B25C 5/10* | (2006.01) |
| *B25C 5/15* | (2006.01) |
| *F16B 15/00* | (2006.01) |
| *B25C 5/16* | (2006.01) |
| *B25C 1/06* | (2006.01) |
| *F16B 15/06* | (2006.01) |

(52) U.S. Cl.
CPC ............ *F16B 15/0015* (2013.01); *B25C 1/06* (2013.01); *B25C 5/15* (2013.01); *B25C 5/1644* (2013.01); *F16B 15/06* (2013.01)

(58) Field of Classification Search
CPC ................ B25C 5/10; B25C 1/00; B25C 1/06

USPC ............................. 227/129, 132, 8; 173/205
See application file for complete search history.

(56) References Cited

U.S. PATENT DOCUMENTS

| | | | | |
|---|---|---|---|---|
| 3,924,692 A | | 12/1975 | Saari | |
| 4,384,622 A | * | 5/1983 | Koziniak | ................ B25C 1/001 |
| | | | | 173/117 |
| 4,984,640 A | * | 1/1991 | Gillan | ........................ B21J 7/42 |
| | | | | 173/114 |
| 5,794,325 A | * | 8/1998 | Fallandy | ............... B25D 11/108 |
| | | | | 173/203 |
| 5,836,403 A | * | 11/1998 | Putney | .................... B25B 21/02 |
| | | | | 173/205 |
| 6,138,772 A | * | 10/2000 | Miescher | ............... B25D 16/00 |
| | | | | 173/109 |
| 6,213,222 B1 | * | 4/2001 | Banach | ................... B25D 16/00 |
| | | | | 173/1 |
| 6,733,414 B2 | * | 5/2004 | Elger | ...................... B25B 21/02 |
| | | | | 173/109 |
| 6,785,950 B1 | * | 9/2004 | Scirbona | .............. B25D 11/102 |
| | | | | 173/203 |
| 7,757,922 B2 | | 7/2010 | Wang | |

(Continued)

*Primary Examiner* — Gloria R Weeks
(74) *Attorney, Agent, or Firm* — Leydig, Voit & Mayer, Ltd.

(57) ABSTRACT

An impact device includes a drive assembly, a cam having a ramp and a fall-off, and a follower associated with the cam. During rotation of the cam, one of the cam or the follower axially displaces as the follower traverses the cam and falls off the fall-off to transform the rotary motion of the drive assembly to a reciprocating motion having a saw-tooth shape that includes a gradual retraction and a quick extension. The quick extension creates an impact loading, which can be used, for example, for driving a fastener into a work piece.

17 Claims, 7 Drawing Sheets

(56) References Cited

U.S. PATENT DOCUMENTS

| | | | |
|---|---|---|---|
| 7,992,756 B2 * | 8/2011 | Franz | B25C 5/15 |
| | | | 227/132 |
| 8,505,798 B2 * | 8/2013 | Simonelli | B25F 5/006 |
| | | | 227/132 |
| 10,442,066 B2 * | 10/2019 | Nishikawa | B25C 7/00 |
| 2009/0236387 A1 * | 9/2009 | Simonelli | B25C 5/1668 |
| | | | 227/8 |

* cited by examiner

IMPACT DEVICE

CROSS-REFERENCE TO RELATED APPLICATIONS

This patent application claims the benefit of U.S. Provisional Patent Application No. 62/587,597, filed on Nov. 17, 2017, and U.S. Provisional Patent Application No. 62/667,678, filed on May 7, 2018, both of which are incorporated herein in their entirety by this reference.

FIELD OF THE DISCLOSURE

The disclosure relates to tools, and, more particularly, to a tool for driving staples or similar fasteners.

BACKGROUND OF THE DISCLOSURE

It has become common practice, particularly where a considerable amount of fastening is to be undertaken, to use an impact device operated by electricity for ejecting fasteners. Such an impact device is particularly useful in stapling applications, because considerable force is required to operate a hand stapler and this physical activity, when carried on for a long period of time, is very difficult. As opposed to pneumatically operated impact tools, motorized impact devices use an electrical motor or actuator to operate a punch. The punch causes a staple or a similar fastener, typically held in a multiple-fastener clip, to be ejected from the tool for fastening purposes.

The impact device not only permits operation over long periods of time without the worker becoming tired, but it also allows an even stronger force available for ejecting fasteners than is possible with a manually-operated device. Nevertheless, there are a number of problems that arise in connection with such electrically operated impact devices, such as electric staplers. While some electric staplers are operated by a solenoid and the power available is alternating current, there is a tendency for the tool to bounce which can lead to a destruction of the material being fastened and can also result in irregular placing of the fastener, as well as ejecting multiple fasteners when only one fastener is desired or required. Also, solenoid operated impact devices may be prone to overheating in heavy usage. Other types of electric impact devices employ rotating motors for operating a stapling mechanism. Electrical impact devices are often bulky or awkward to use. These and other difficulties experienced with the prior art devices have been obviated in a novel manner by devices of the present disclosure.

BRIEF SUMMARY OF THE DISCLOSURE

In one aspect, the present disclosure describes an impact device for driving a fastener into a work piece. The impact device includes a housing, and a reciprocating assembly having a longitudinal axis and an outer periphery. The reciprocating assembly has a cam, which includes a ramp and a fall-off, and a follower associated with the cam. One of the cam or the follower is reciprocally mounted in the housing, and one of the cam or the follower is rotatably mounted in the housing. At least one drive spring is disposed in compression between the reciprocally mounted cam or follower and the housing. A drive assembly provides rotary motion to the rotatably mounted cam or follower such that, during presence of the rotary motion, the reciprocally mounted cam or follower displaces parallel to the longitudinal axis as the follower traverses the cam and the fall-off to transform the rotary motion to a reciprocating motion. An impactor is connected to the reciprocally mounted cam or follower and extends parallel to the longitudinal axis and follows the reciprocating motion. A fastener housing is connected to the housing and adapted to contain at least one fastener. The impactor is adapted to communicate the reciprocating motion from the reciprocating cam or follower to the at least one fastener and drive it into a work piece. The drive assembly is disposed substantially within an outer periphery extending radially relative to the longitudinal axis and defined by a radially larger of the cam or follower.

In another aspect, the disclosure describes an impact device for driving a fastener into a work piece. The impact device includes a housing, the housing containing a drive assembly and a reciprocating assembly having a longitudinal axis. The drive assembly provides a rotary motion along a drive axis that is parallel to the longitudinal axis. A cam includes a ramp and a fall-off. The cam is disposed along a cam length along the longitudinal axis. A follower is associated with the cam. The cam is rotatably coupled to the drive assembly such that the cam rotates about the longitudinal axis. During rotation of the cam, the cam or the follower is permitted to axially displace as the follower traverses the cam and falls off the fall-off to transform the rotary motion of the drive assembly to a reciprocating motion. The one of the cam or the follower that is permitted to axially displace is biased away from the drive assembly by at least one drive spring disposed in compression between the one of the cam or the follower, and the housing. The at least one spring extends parallel to the longitudinal axis along a spring length. An impactor extends parallel to the longitudinal axis along a impactor length. The impactor is slidably disposed within the housing and connected with the one of cam or follower that is permitted to axially displace such that the impactor follows the reciprocating motion. A fastener housing is connected to the housing and adapted to contain at least one fastener. The impactor is adapted to communicate the reciprocating motion between the one of the cam or follower that is permitted to axially displace to an end of the at least one fastener, which drives the fastener into a work piece. The impactor length and the spring length at least partially overlap.

In yet another aspect, the disclosure describes a method for creating a reciprocating motion within an impact device. The method includes providing a reciprocating assembly having a longitudinal axis and an outer periphery within a housing, the reciprocating assembly having a cam, which includes a ramp and a fall-off, and a follower associated with the cam; reciprocally mounting the cam or the follower in the housing and, further, rotatably mounting the cam or the follower in the housing; biasing the reciprocally mounted cam or follower within the housing using a spring; providing a rotary motion to the rotatably mounted cam or follower such that, during presence of the rotary motion, the reciprocally mounted cam or follower displaces parallel to the longitudinal axis as the follower traverses the cam and the fall-off to transform the rotary motion to a reciprocating motion; connecting an impactor to the reciprocally mounted cam or follower, the impactor extending parallel to the longitudinal axis and following the reciprocating motion; connecting a fastener housing to the housing and adapting the fastener housing to contain at least one fastener; communicating the reciprocating motion from the reciprocating cam or follower to the at least one fastener through the impactor; and confining the drive assembly substantially within an outer periphery extending radially relative to the longitudinal axis and defined by a radially larger of the cam or follower.

BRIEF DESCRIPTION OF THE SEVERAL VIEWS OF THE DRAWING(S)

DETAILED DESCRIPTION OF A PREFERRED EMBODIMENT

The present disclosure relates to an impact tool and, more specifically, to an impact driver for fasteners such as staples. For illustrative purposes, an electric staple gun will be shown and described, and it will be understood that the construction of the illustrated device may be employed or applied to other impact tools.

Figure 1:
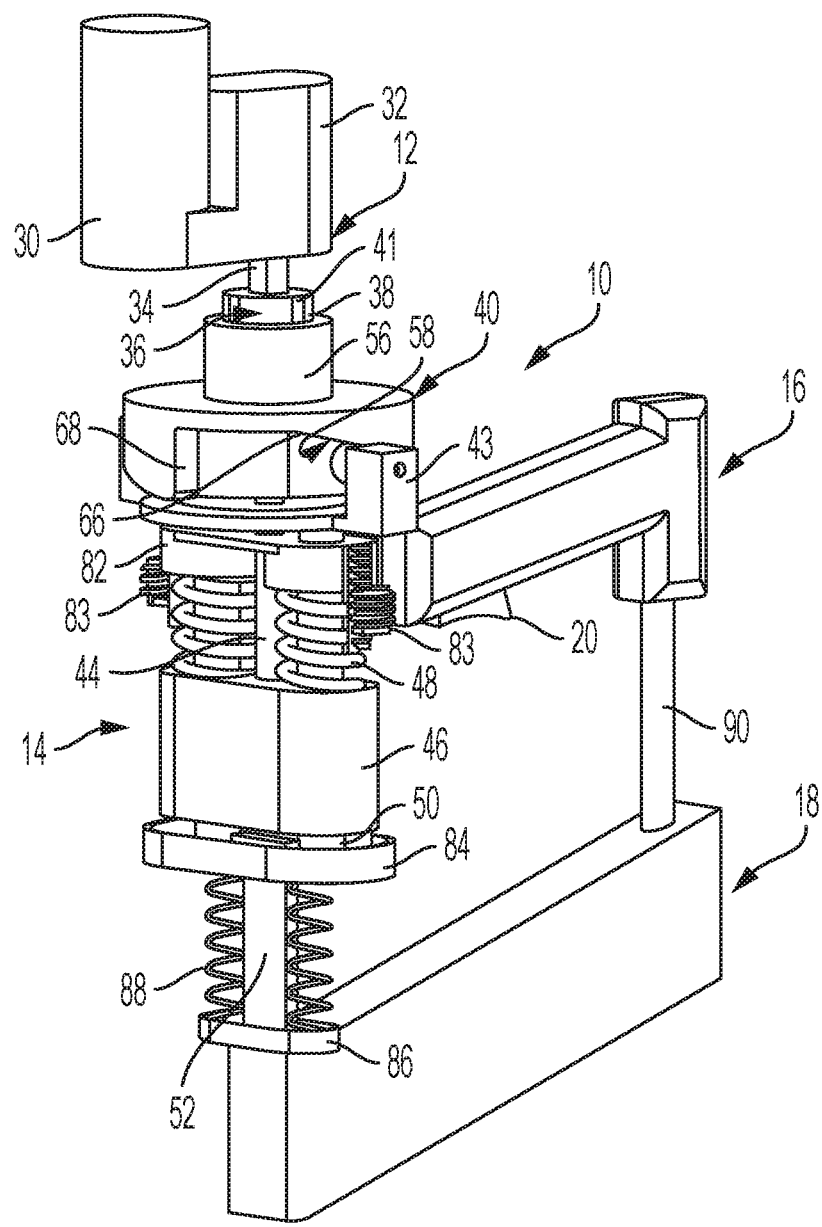
FIG. 1 is a perspective view of one embodiment for an impact device in accordance with the disclosure.

Referring to FIG. 1, an impact device 10 is shown that includes a drive assembly 12 and a staple mechanism 14 that is driven by the drive assembly. The impact device 10 includes a handle 16 with a trigger mechanism 20 that enables operation of the drive assembly 12. A fastener housing 18 is configured to enclose a plurality of fasteners (see FIG. 2), which fasteners may be provided in a clip form for easy handing and loading as is known. In an alternative embodiment, the fasteners may be nails, pig rings, or any other type of fastener.

Figure 2:
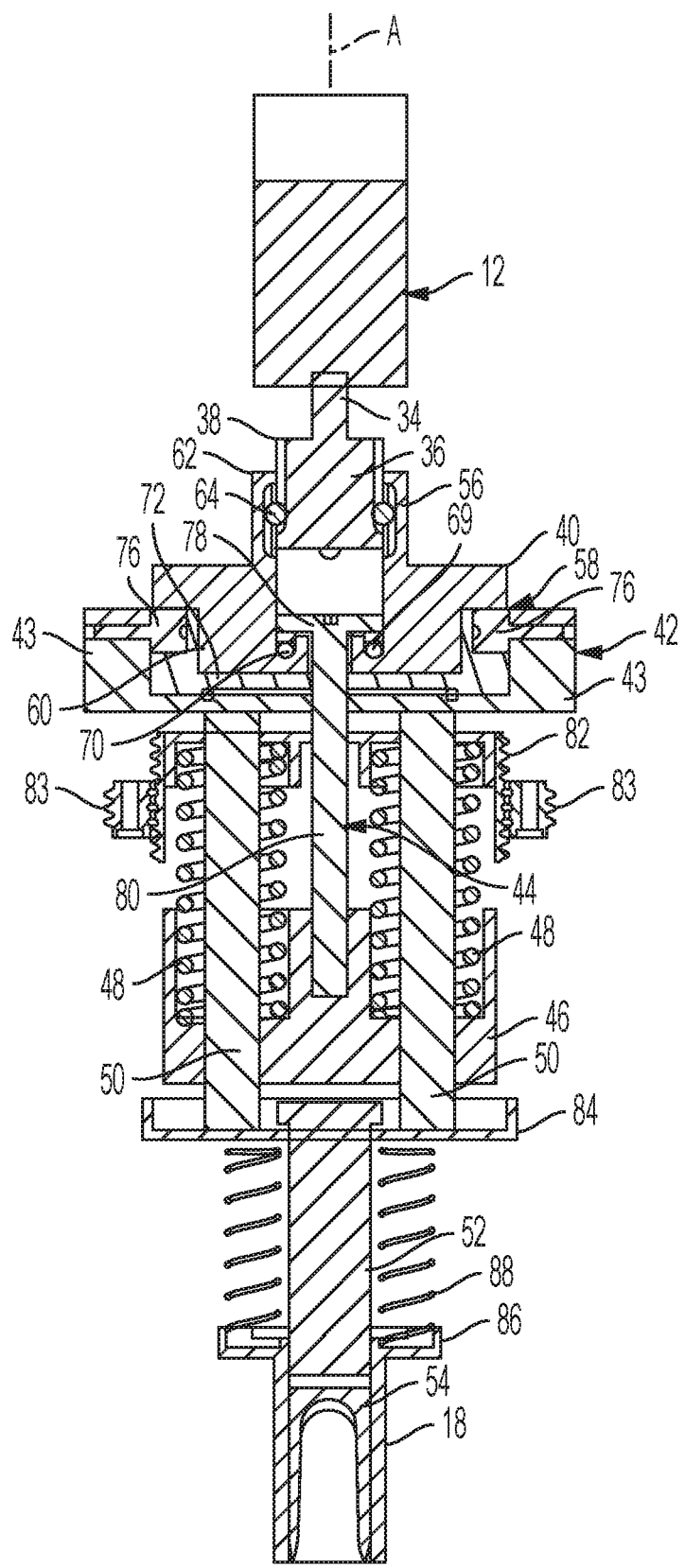
FIG. 2 is a cross section view of the device of FIG. 1.

Also referring to FIG. 2, the drive assembly 12 includes an electric motor 30 that drives a gear box or transmission 32. The electric motor 30 may operate on alternating current or direct current and is provided in communication with a source of electricity appropriate for the type of motor. The gear box 32 may employ a reduction gear assembly, as is well known, the output of which is via drive shaft 34. The drive shaft 34 may be rectangular, hexagonal or some other suitable shape. The drive shaft 34 may fixedly attach to or terminate in a coupler 36. The coupler 36 may be generally cylindrical and may include axial splines 38 spaced about the periphery thereof. The splines 38 define therebetween a plurality of spaced axial grooves or races 41. The coupler 36 is caused to rotate through operation of the gear box 32 when the motor 30 is actuated by the trigger mechanism 20. Rotation of the coupler 36 causes operation of the staple mechanism 14.

Figure 5:
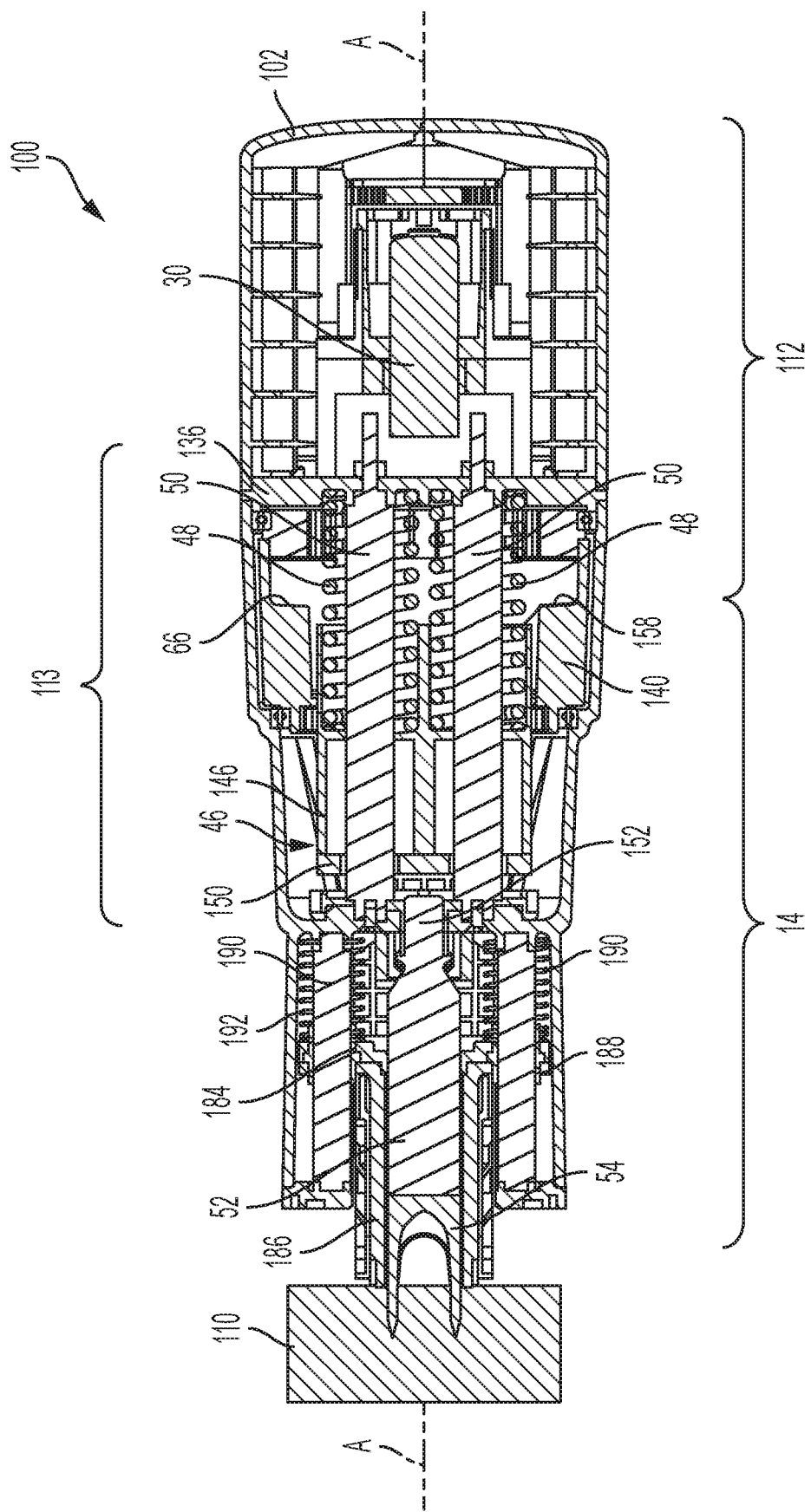
FIG. 5 is a cross section view of the impact device of FIG. 3 from a top perspective.

The staple mechanism 14 includes a reciprocating assembly 113 (FIG. 5) comprising a cam 40 that rotates about a longitudinal axis A, and causes a driver, which will be referred to as a mass 46, to translate or move along the axis A, or a parallel axis. Movement of the mass 46 causes the mass to impact a punch 52, which in turn ejects a staple or other fastener 54 forcefully from fastener housing 18.

The cam 40 includes a coupler portion 56, one or more exterior ramp elements 58, and a drive portion 60. The coupler portion 56 is configured as a hollow sleeve and receives the coupler 36 internally. The coupler portion 56 includes a radially inwardly projecting flange 62. The flange 62 cooperates with an inverse shape on the coupler 36 to retain roller balls 64 between the coupler and coupler portion 56 and prevent the coupler portion from disengaging or otherwise being decoupled from the coupler.

The plurality of roller balls 64 are disposed in races 41. When the coupler is rotated, the roller balls 64, which are positioned between the coupler 36 and the coupler portion 56, urge the cam 40 to rotate, while permitting the cam to also translate axially along axis A relative to the coupler.

The cam features 58 include helical or similar shaped ramps disposed on the outer periphery of the cam and are downward facing. The cam 40 may include one or more ramps 58 on its periphery. In one embodiment, the cam 40 includes a pair of ramps 58 formed on opposing sides of the cam, so as to produce an impact event every 180 degrees of rotation of the cam. The ramps 58 each include a helical face 62 and a fall-off 68. The drive portion 60 of the cam 40 is formed opposite the coupler portion 56 and includes a circular groove 69 in which ball bearings 70 are positioned. The drive portion 60 includes a central opening 72.

The staple mechanism 14 includes a stationary housing and follower assembly 42 that is configured to cooperate with the cam 40 to produce axial motion from the rotational motion of the cam in an impactor 44 that is supported by the cam. The housing and follower assembly 42 receives the drive portion 60 of the cam 40.

The impactor 44 includes a flared end 78 that is located in interior of the cam 40 and a rod portion 80 that extends from the cam and through the opening 72. The flared end 78 is supported on the ball bearings 70, which permits the cam to rotate and the impactor 44 to remain stationary, while enabling the cam to lift and lower the impactor when the cam translates axially by interaction with the housing and follower assembly 42.

The housing and follower assembly 42 may include a flat housing body with upwardly extending arms 43. The housing and follower assembly 42 includes one or more cam roller 76, each mounted on an arm 43. Each cam roller 76 is positioned to bear upon a ramp 58 of the cam 40. The housing and follower assembly 42 is connected to the handle 16 so as to remain stationary, while the cam 40 rotates. A pair of spaced fixed guide rods 50 depend in the axial direction from the housing and follower assembly 42.

The staple mechanism 14 includes a mass 46 attached to the impactor 44 that operates as an impact head or driver element. The mass is axially movable on the pair of spaced guide rods 50. Optional bushings may be disposed between the mass 46 and the guide rods 50 to reduce friction and facilitate the slidable motion therebetween. A drive spring 48 is disposed about each of the guide rods 50 and positioned between the mass 46 and a pre-load plate 82. The pre-load plate 82 is positioned underneath and spaced from the housing and follower assembly 42 so as to hold the springs 48 in a biased condition. The pre-load plate 82 is axially adjustable so as to compress, or pre-load, the springs 48 a specified amount corresponding to a desired force to be generated by the staple mechanism 14. The adjustable pre-load, which may be effected by rotation of flanking screw devices 83, permits the impact device 10 to be used to drive fasteners a desired depth into a variety of materials having various hardness or penetrability.

Rotation of the cam 40 urges the cam rollers 76 to raise the cam, which in turn raises the impactor 44. The upward motion of the impactor 44 raises the mass 46, which compresses the drive springs 48 against the pre-load plate 82. The cam ramps 58 have a saw-tooth shape so the compression motion is gradual corresponding to the incline of the inclined face 66. When the cam rollers 76 encounter the fall offs 68 the drive springs 48 release the energy stored during compression and the mass 46 is released and driven downwardly. The downward motion of the mass 46 is arrested when the flared end 78 of the impactor 44 is urged into contact with the balls of the bearing 70 by decompression of drive springs 48. However, while the contact of the head of the flared end 78 making contact with the ball bearing 70 will halt the forward motion of the mass 46, in most cases it will be the impact with the staple 54 that will actually arrest the motion of the mass 46.

The mass 46, when released, impacts upon a driver or punch 52, which in turn drives a staple 54 out of the fastener housing 18. The impact device 10 may be configured to drive the fastener 54 multiple times, when, for example, the fastener must be driven into a hard or dense material. The punch 52 is a T-shaped element with a flared upper end that is fixed to a punch plate 84. The punch plate 84 abuts lower terminal ends of the guide rods 50 in an initial, unactuated position. When the mass 46 is driven downwardly, the flared end of the punch 52 is struck and is driven toward the fastener housing 18 and strikes a staple 54. The punch plate 84 is also driven downwardly by movement of the punch 52 being struck by the mass 46.

The fastener housing 18 includes a spring tray 86. One or more punch return spring 88 is positioned and biased between the spring tray 86 and the punch plate 84. As the punch 52 is driven toward the staple 54, the punch return spring 88 is compressed between the converging punch plate 84 and the spring tray 86. When the mass 46 is returned to an initial un-deployed position by rotation of the cam 40, the punch 52 is returned to an initial position spaced apart from the fastener housing 18, which permits the device 10 to urge a subsequent staple into position to be driven by a subsequent driving event. Alternatively, the impact device 10 may preferably be configured to generate multiple driving events to drive one fastener 54 into a hard or dense material. This mode of operation is particularly well suited to the present embodiment, where multiple strikes may be rapidly generated via rapid rotation of the cam 40 by the motor 30 and gear box 32.

The impact device 10 includes a frame member 90 that interconnects the fastener housing 18 to the handle 16. The various elements of the impact device 10 may be made of any suitable material, such as metal, plastic, and/or composites.

It should be appreciated that the function of certain structures of the drive mechanism shown in FIGS. 1 and 2 could be reversed. For example, the housing and follower assembly 42 may be rotatably mounted on the housing such that it rotates with respect to the housing when driven by the motor 12 via an appropriate mechanism. In such embodiment, the cam 40 may not rotate and instead be reciprocally mounted on the housing such that, as the follower 42 rotates, inward facing rollers 76 of the follower 42 bear against the ramps of the cam 40 causing it to reciprocate within the housing. Depending on orientation of the ramps on the cam, the drive springs may be oriented such that the cam surfaces are pressed against the followers. In one embodiment, therefore, the springs may urge the cam towards the motor, while in another embodiment, the cams may urge the cam away from the motor.

Figure 3:
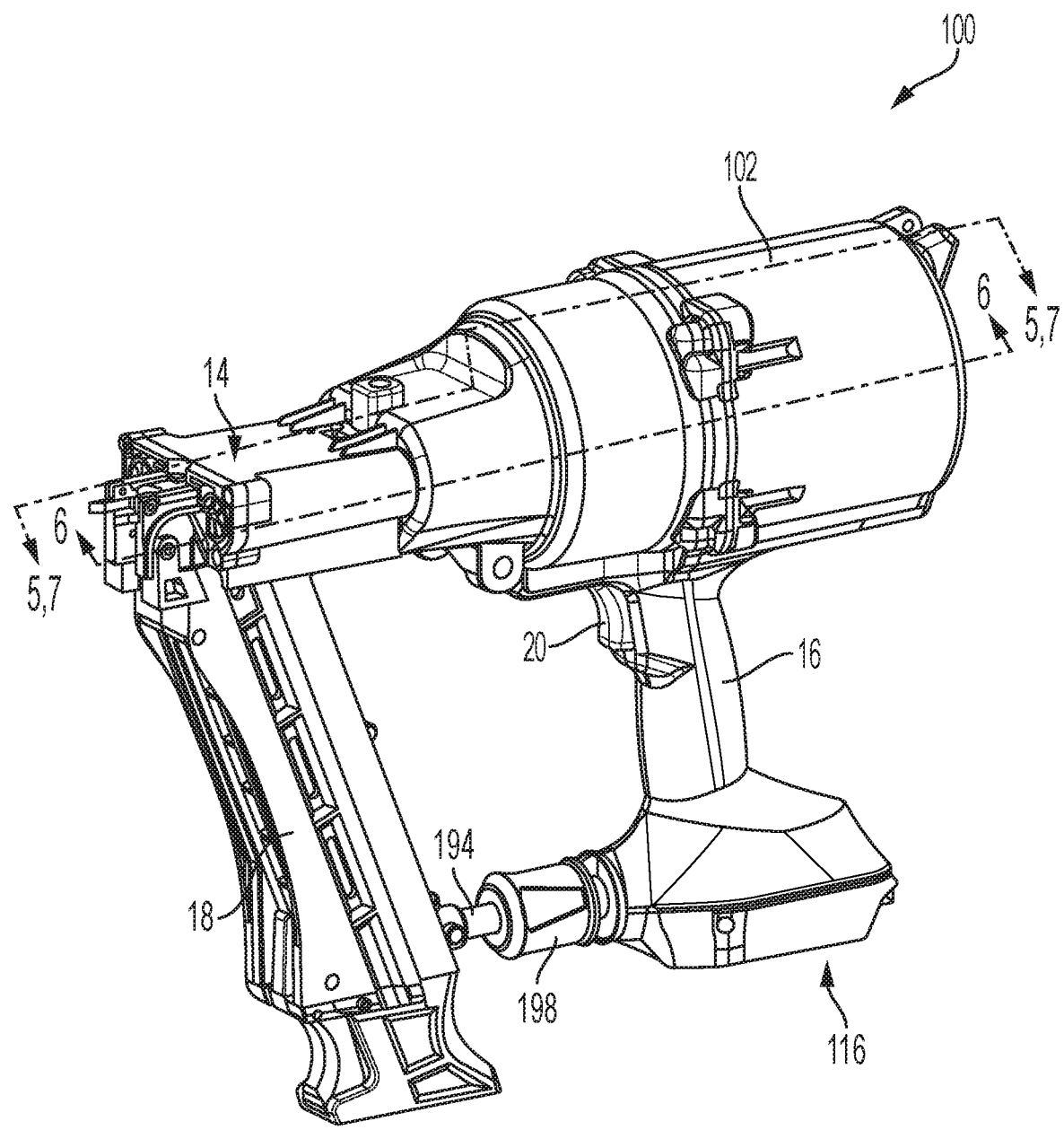
FIG. 3 is a perspective view of another embodiment for an impact device in accordance with the disclosure.

An alternative embodiment of an impact device 100, which is embodied as a staple driver, is shown in FIG. 3. In the description that follows relative to the impact device 100, structures and features that are the same or similar to corresponding structures and features previously described are denoted by the same reference numerals previously used for simplicity. In reference to FIG. 1, and also the remaining views shown in FIGS. 4-7, the impact device 100 includes a 112 (FIG. 4) and a staple mechanism 14 that is driven by the drive assembly 115. The impact device 100 includes a handle 16 with a trigger mechanism 20 that enables operation of the drive assembly 12. A fastener housing 18 is configured to enclose a plurality of fasteners 54 (see FIG. 6). A guide 19 permits mounting of the fastener housing 18 at different positions to accommodate fasteners of different lengths. In the illustrated embodiment, the fasteners 54 are provided in a clip or magazine form for easy handing and loading into the fastener housing 18 in the typical fashion. In an alternative embodiment, the fasteners may be nails, pig rings, or any other type of fastener that is provided loose, in a clip or in strip in the known fashion.

Figure 4:
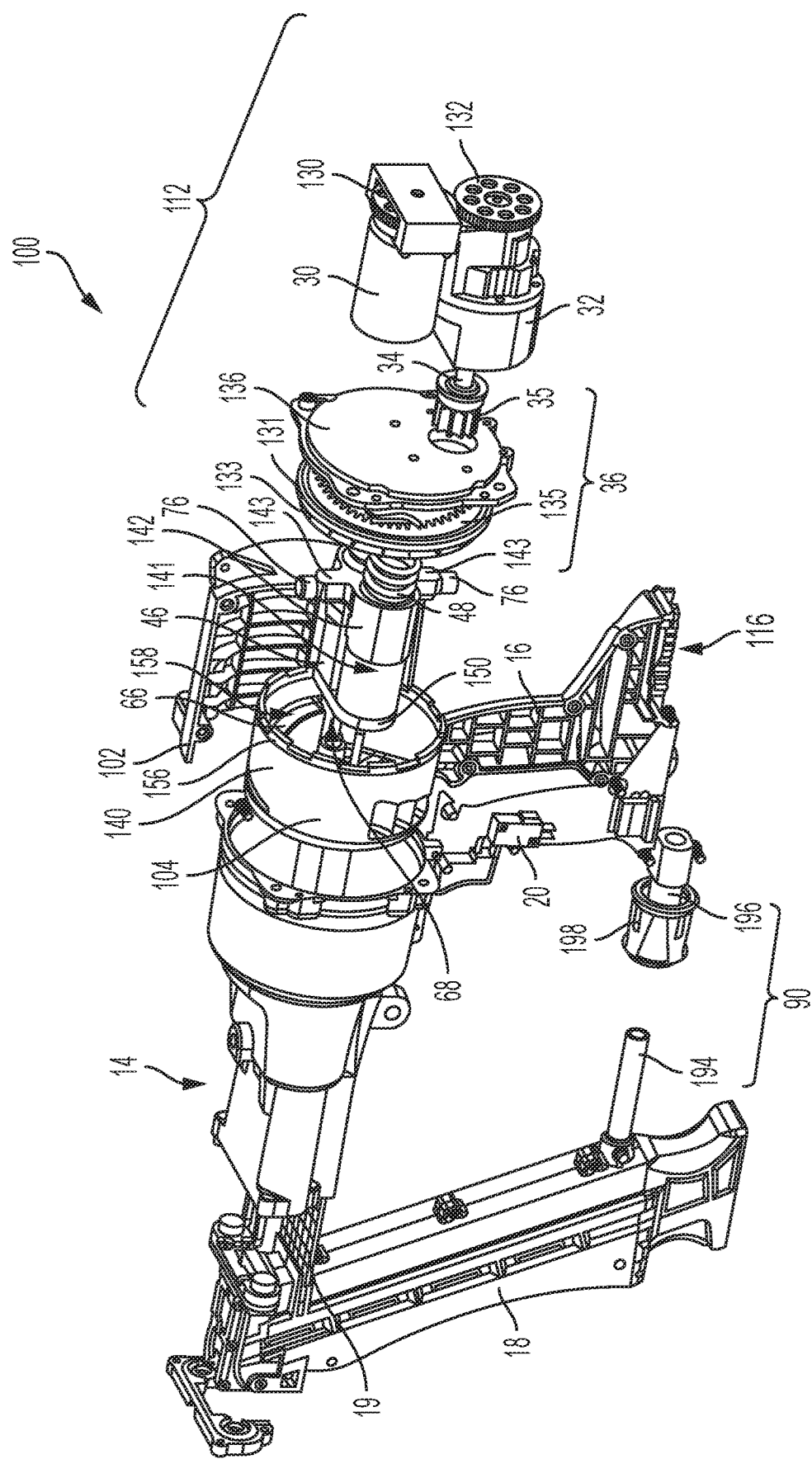
FIG. 4 is an exploded perspective view of the embodiment for an impact device shown in FIG. 3.

As shown in FIG. 4, the drive assembly 112 includes an electric motor 30 disposed in a motor mount 31. The motor 30 drives a gear box or transmission 32. A mechanical drive connection between the motor 30 and the transmission 32 is accomplished by a driver gear 130 connected to an output shaft of the motor 30 and a driven gear 132 connected to an input shaft of the transmission 32. Together, these components define a drive assembly, which can of course be embodied using different components. The electric motor 30 may operate on alternating current or direct current and is provided in communication with a source of electricity appropriate for the type of motor. In the illustrated embodiment, a DC batter (not shown) operating at any appropriate voltage, for example, 12, 18 or 32 volts, and the like, is connected to a base 116 of the handle 16, and provides electrical power via conduits to operate the motor 30. The electrical power is selectively interrupted by an electrical switch in the trigger mechanism 20 to control operation of the motor 30. The electrical switch may be a simple on/off switch, or may alternatively include a potentiometer, which permits the user to control a speed of the impact device 100 during operation.

The transmission 32 may employ a reduction gear assembly, and provides rotational motion from the motor 30 to a drive shaft 34. The drive shaft 34 may be round, rectangular, hexagonal or any other suitable shape. The drive shaft 34 may fixedly attach to or terminate in a drive gear 35. The drive gear 35 meshes with a ring gear 135, which is enclosed by a cover 136 (FIG. 4). The ring gear 135 drives a collar 131 having teeth 133 formed along its periphery. Together, the ring gear 135 and its driven collar 131 form the coupler 36. The coupler 36 is caused to rotate through operation of the gear box 32 when the motor 30 is actuated by the trigger mechanism 20. Rotation of the coupler 36 causes operation of the staple mechanism 14.

The staple mechanism 14 includes a cam 40 that rotates about a longitudinal axis A and causes a driver, which will be referred to as a mass 46, to translate or move along the axis A. Movement of the mass 46 causes the mass to impact a punch 52, which in turn ejects a staple or other fastener 54 forcefully from the fastener housing 18.

The impact device 100 further includes a cam 140. The cam 140 includes a coupler portion 156, which in the embodiment shown in FIG. 4 includes teeth that meshably engage the teeth 133 of the collar 131 such that the cam 140, and coupler 36, are rotatably engaged with one another. Unlike the cam 40 shown in FIGS. 1 and 2, the cam 140 of the embodiment shown in FIGS. 3-7 has a hollow cylindrical or cup shape that surrounds the cam follower and various other structures. The cam 140 is axially constrained and rotatably mounted within a housing 102 of the impact device 100. The cam 140 includes a peripheral wall 104 that forms one or more interior ramp elements or cam features 158.

The peripheral wall 104 defines an outer periphery of the reciprocating assembly that extends radially relative to the longitudinal axis A. In an embodiment such as the one shown in FIGS. 1 and 2, the outer periphery of the reciprocating assembly may be defined by the follower 42. In the embodiment shown in FIGS. 3-7, the outer periphery is defined by the outer wall of the cam 140. In general, as used herein, the outer periphery of the reciprocating assembly is meant to define an imaginary surface that extends parallel to the longitudinal axis A and peripherally bounds the larger of the cam or follower. In the embodiments shown herein, the compact and balanced arrangement of components permits the drive mechanism to be substantially within the outer periphery of the reciprocating assembly. This is the case for all disclosed embodiments as can be seen for example, by the arrangement of components within the cylindrical housing in FIG. 4. In a general case, this arrangement allows at least the drive shaft 34 to lie within the outer periphery, which can still provide advantages in the compactness of the device and also the balancing of the device during operation.

The cam 140 is configured as a hollow sleeve or cup that forms the cam features 158 internally and along the wall 104.
The cam features 158 include helical or similar shaped ramps disposed on the inner periphery of the cam and are backward facing, i.e., facing towards the motor 30. The cam 140 may include one or more cams 158 on its periphery. In one embodiment, the cam 140 includes a pair of ramps 158 formed on opposing sides of the cam, so as to produce an impact event every 180 degrees of rotation of the cam 140. Each of the ramps 58 includes a helical face 62 and a fall-off 68.

Figure 6:
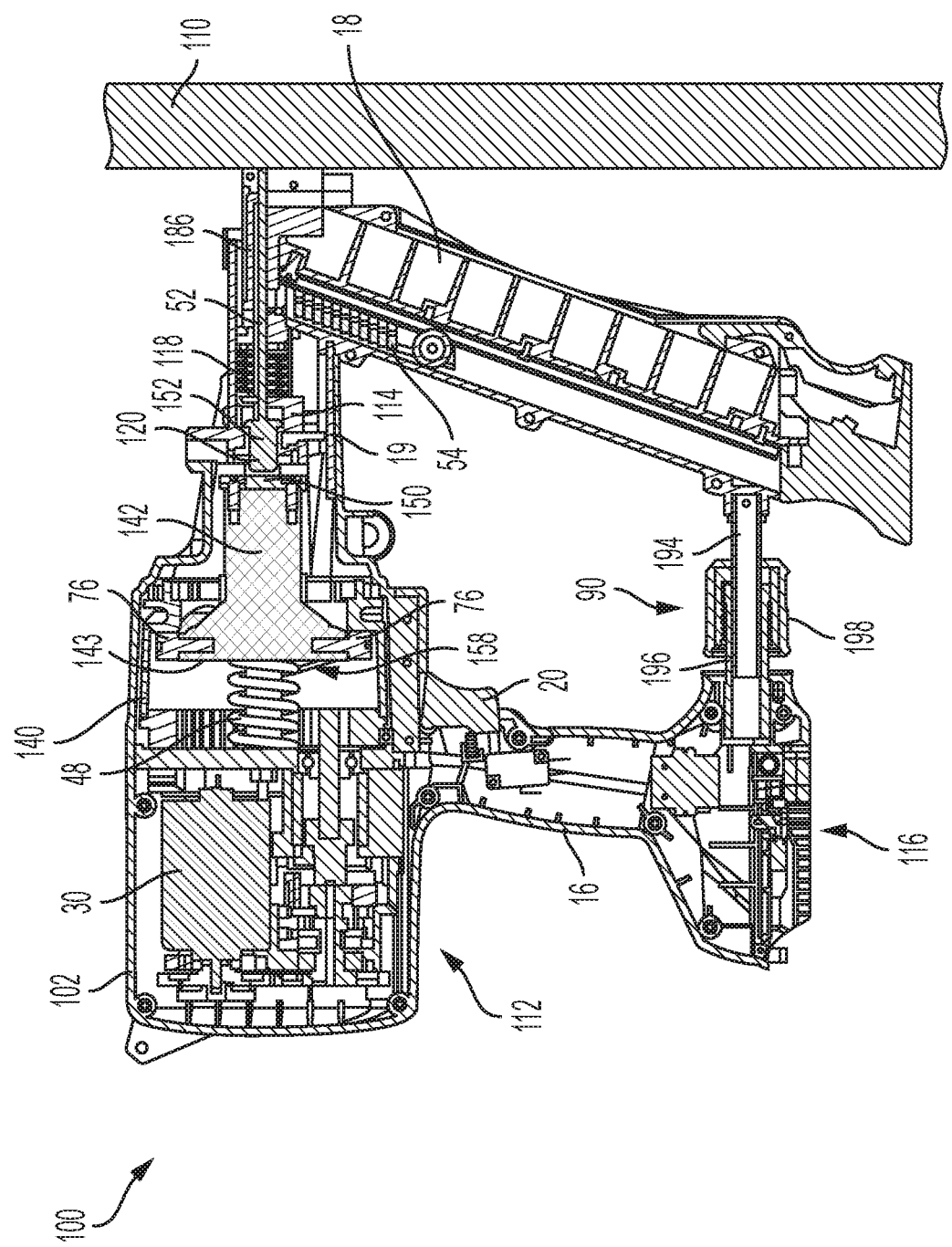
FIG. 6 is a cross section view of the impact device of FIG. 3 from a side perspective.
Figure 7:
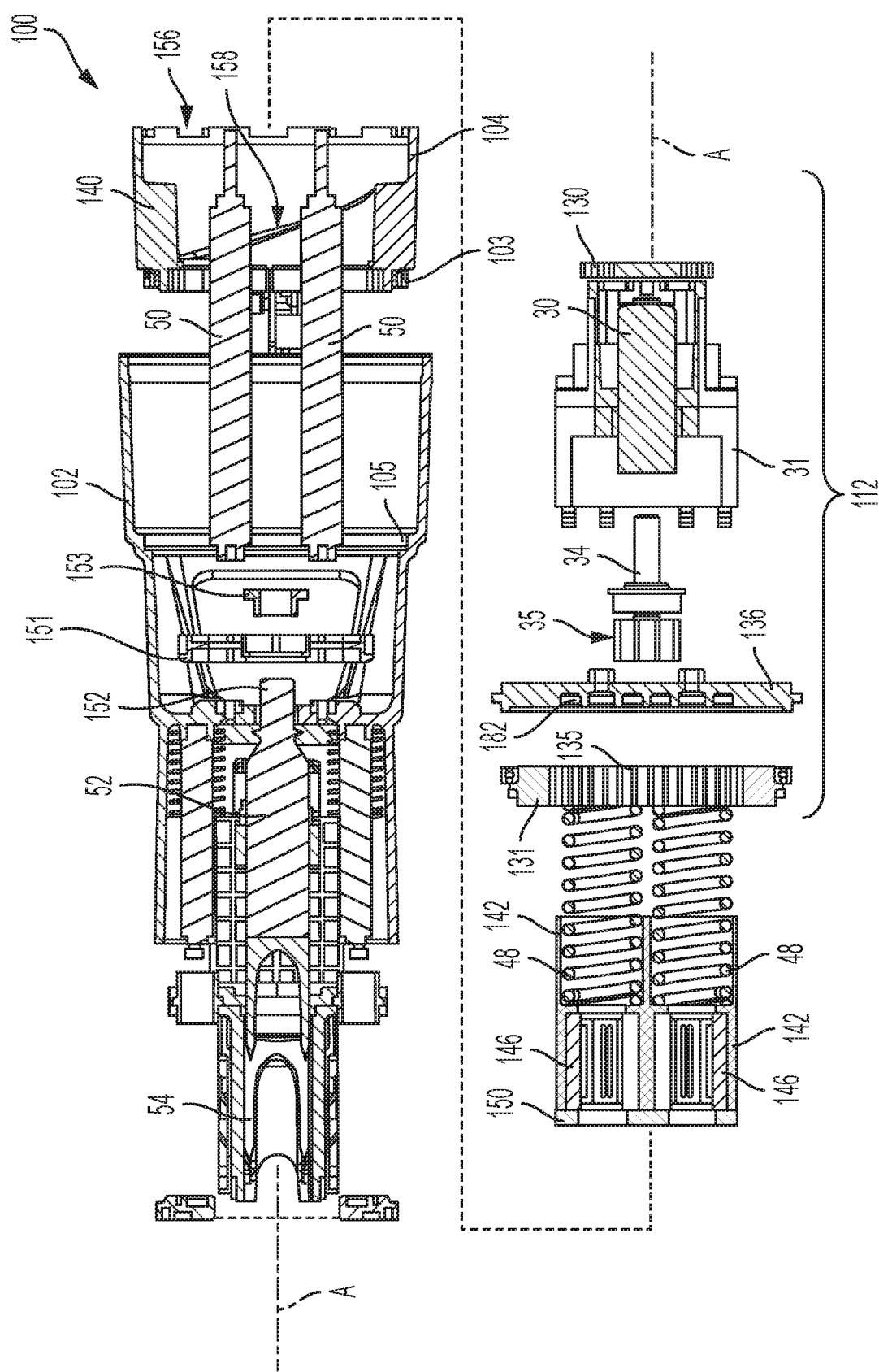
FIG. 7 is an exploded view in cross section of the impact device of FIG. 3.

The staple mechanism 14 includes a follower assembly 142 (FIG. 6) that is configured to cooperate with the cam 140 to produce axial motion from the rotational motion of the cam 140 in the follower assembly 142, which follower assembly also includes the mass 46, which is augmented by weights or masses 146 (FIGS. 6 and 7), which may be made from a heavy or dense material such as metal. The follower assembly 142 includes a body 141 (FIG. 4) with outwardly arms 143. The follower assembly 142 further includes one or more cam followers or rollers 76, each mounted on an arm 143. Each cam roller 76 is positioned to bear upon a ramp 158 of the cam 140. In this way, as the cam 140 rotates, the follower assembly is pulled back while the cam rollers 76 are ascending on the ramps of the cams 158, and snaps forward when the followers 76 fall off the fall-offs 68. The cam 140 is rotatably mounted onto the housing 102 via a bearing 103, which is seated in a groove 105 such that the cam 140 is axially constrained from moving relative to the housing 102, as shown in FIG. 7. In this way, the rotational motion of the cam 140 is transformed to a reciprocal or saw tooth motion of the follower assembly 142. A pair of spaced fixed guide rods 50 (FIG. 5) extend in the axial direction from the housing and guide the reciprocal motion of the follower assembly 142 along the axis A.

The staple mechanism 14 includes the masses 146, which are embodied as slugs embedded into the end of the follower assembly 142 that is opposite the followers 76 and that operates as an impact head or driver element through and end-plate 150. The end-plate 150 terminates at a guide plate 151 that includes a bushing 153 to guide the punch 52. The masses 146 are axially movable on the pair of spaced guide rods 50 along with the follower assembly 142. Optional bushings may be disposed between the masses 146 and the guide rods 50 to reduce friction and facilitate the slidable motion there-between. A drive spring 48 is disposed about each of the guide rods 50 and positioned between the masses 146 and retainer grooves 182 formed on an underside of the cover 136, as shown in FIG. 7. The cover 136 and retainer grooves 182 hold the springs 48 in constantly compressed condition to provide dampening and retention to the follower assembly 142.

Rotation of the cam 140 urges the cam rollers 76 to pull the follower assembly 142 and masses 146 in a direction away from the head 152, which compresses the drive springs 48 against the cover 136, thus storing potential energy in the springs 48. The cams 158 have a saw-tooth shape so the compression motion is gradual corresponding to the inclination of the inclined face 66. When the cam rollers 76 encounter the fall offs 68, the drive springs 148 release the potential energy stored during compression and the masses 146 along with the follower assembly 142 are released and driven by the springs 48 forward, towards the staple 54. The masses 146 accelerate over the distance they cover from their furthermost position towards the head 152. The motion of the masses 146 is arrested when end-plate 150 strikes a head 152 of the punch 52, which transfers to the punch 52 an impact loading that is transferred through the punch 52 to the staple 54, driving the same into a wall 110. The impact loading is proportional to the momentum developed by the accelerating masses 146, which momentum depends on the mass of the masses 146 and also the force and resulting acceleration provided by the springs 48.

The mass 46, when released, impacts upon a driver or punch 52, which in turn drives a staple 54 out of the fastener housing 18. The impact device 100 may be configured to drive the fastener 54 multiple times, when, for example, the fastener must be driven into a hard or dense material. The punch 52 is an elongate shaped element with a flat, plate-shaped outer face that matches or is smaller in thickness than the staples 54 such that it can push on the staple 54 and drive it into the material in which it is installed. The punch 52 is slidably disposed within a punch seat 114, which guides and provides an axial length that limits travel of the punch 52 by use of a blind bore 118 that accepts therein reciprocally a head 120 of the punch 52. A punch plate 184 and guide plate 186 slidably surround and guide a mid-portion of the punch via a pair of sliding collars 188. The sliding collars 188 are disposed along guide pins 190 that maintain alignment along the axial direction of the guide plate 186, the punch plate 184 and the punch 52. Return springs 192 are disposed between the housing 102 and the collars 188 and are biased to push the guide plate 186 towards the staple 54 such that contact can always be maintained during a driving operation between and end of the guide plate and the wall 110, which means that the staple 54 can be maintained in a straight orientation and driven along the axis A during its entire travel into the wall 110.

The impact device 100 further includes a spacer arrangement or frame member 90 that interconnects the fastener housing 18 to the handle 16. The spacer arrangement 90 in this embodiment includes a male structure 194 and a female structure 196 that are slidably disposed and axially constrained relative to one another. A radial fastener arrangement 198, which as shown in FIG. 6 includes a threaded portion and a nut, can selectively fix and adjust the axial relative location of the structures 194 and 196 to set the distance between the fastener housing 18 and the handle 16 and, thus, along with the guide 19 (FIG. 4), permit the accommodation of fasteners of different lengths. The various elements of the impact device 100 may be made of any suitable material, such as metal, plastic, and/or composites.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. The use of the term "configured" is to be construed to refer to structural shapes or specific forms that enable a specific purpose.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. An impact device for driving a fastener into a work piece, the impact device comprising:
    a housing;
    a reciprocating assembly having a longitudinal axis and an outer periphery, the reciprocating assembly having a cam, which includes a ramp and a fall-off, and a follower associated with the cam, wherein one of the cam or the follower is reciprocally mounted in the housing, and wherein one of the cam or the follower is rotatably mounted in the housing;
    the outer periphery extending radially from the longitudinal axis and defined by the radially larger of the cam or follower;
    at least one drive spring disposed in compression between the reciprocally mounted cam or follower and the housing;
    a drive assembly providing rotary motion to the rotatably mounted cam or follower such that, during presence of the rotary motion, the reciprocally mounted cam or follower displaces parallel to the longitudinal axis as the follower traverses the cam and the fall-off to transform the rotary motion to a reciprocating motion;
    an impactor connected to the reciprocally mounted cam or follower, the impactor extending parallel to the longitudinal axis and following the reciprocating motion; and
    a fastener housing connected to the housing and adapted to contain at least one fastener;
    wherein the impactor is adapted to communicate the reciprocating motion from the reciprocating cam or follower to the at least one fastener and drive it into a work piece; and
    wherein the drive assembly is disposed substantially within the outer periphery.

2. The impact device of claim 1, wherein the cam is reciprocally and rotatably mounted in the housing, and wherein the follower is stationary.

3. The impact device of claim 2, wherein the outer periphery is defined by the follower.

4. The impact device of claim 1, wherein the cam is rotatably mounted in the housing and wherein the follower is reciprocally mounted in the housing.

5. The impact device of claim 4, wherein the outer periphery is defined by the cam.

6. The impact device of claim 1, wherein the follower is rotatably mounted in the housing and wherein the cam is reciprocally mounted in the housing.

7. The impact device of claim 6, wherein the outer periphery is defined by the follower.

8. The impact device of claim 1, wherein:
    the spring is disposed along a spring length parallel to the longitudinal axis, and the impactor extends parallel to the longitudinal axis along an impactor length; and
    further comprising a guide rod connected to the housing and extending parallel to the longitudinal axis along a guide rod length, wherein the impactor is engaged along the pair of guide rods and wherein the impactor length, the spring length and the guide rod length at least partially overlap.

9. The impact device of claim 1, further comprising a punch disposed in the housing along the longitudinal axis adjacent the impactor, wherein the punch is disposed in contact between the at least one fastener and an end of the impactor.

10. The impact device of claim 1, wherein the cam has a generally hollow cylindrical shape.

11. The impact device of claim 10, wherein an outer surface of the cam defines an outer periphery having a generally hollow cylindrical shape extending along the longitudinal axis of the housing, and wherein the drive assembly is disposed radially within the outer periphery defined by the outer surface.

12. The impact device of claim 10, wherein the cam includes a pair of ramps formed on opposing sides of the cam so as to produce an impact event every 180 degrees of rotation of the cam.

13. The impact device of claim 10, wherein the follower includes a body with outwardly facing rollers symmetrically arranged around the body that bear upon the cam such that, as the cam rotates, the follower is pulled back while the rollers are ascending on the ramps and snaps forward when the rollers fall off the fall-offs.

14. The impact device of claim 10, wherein the drive assembly includes a drive gear that is configured to rotatably drive a ring gear, the ring gear being associated with and arranged to drive the peripheral wall, the drive gear extending along a drive gear length relative to the longitudinal axis, wherein the drive gear length overlaps the spring length along the longitudinal axis.

15. A method for creating a reciprocating motion within an impact device, comprising:
providing a housing;
providing a reciprocating assembly having a longitudinal axis and an outer periphery within the housing, the reciprocating assembly having a cam, which includes a ramp and a fall-off, and a follower associated with the cam;
reciprocally mounting the cam or the follower in the housing and, further, rotatably mounting the cam or the follower in the housing;
biasing the reciprocally mounted cam or follower within the housing using a spring;
providing a rotary motion to the rotatably mounted cam or follower such that, during presence of the rotary motion, the reciprocally mounted cam or follower displaces parallel to the longitudinal axis as the follower traverses the cam and the fall-off to transform the rotary motion to a reciprocating motion;
connecting an impactor to the reciprocally mounted cam or follower, the impactor extending parallel to the longitudinal axis and following the reciprocating motion;
connecting a fastener housing to the housing and adapting the fastener housing to contain at least one fastener;
communicate the reciprocating motion from the reciprocating cam or follower to the at least one fastener through the impactor; and
confining the drive assembly substantially within an outer periphery extending radially from the longitudinal axis and defined by a radially larger of the cam or follower.

16. The method of claim 15, wherein the cam is reciprocally and rotatably mounted in the housing, and the follower is stationary.

17. The method of claim 15, wherein the cam is rotatably mounted in the housing and wherein the follower is reciprocally mounted in the housing.

* * * * *